J. B. CRANE.
IRRIGATION PLOW.
APPLICATION FILED JULY 6, 1917.
1,248,271.
Patented Nov. 27, 1917.
2 SHEETS—SHEET 2.
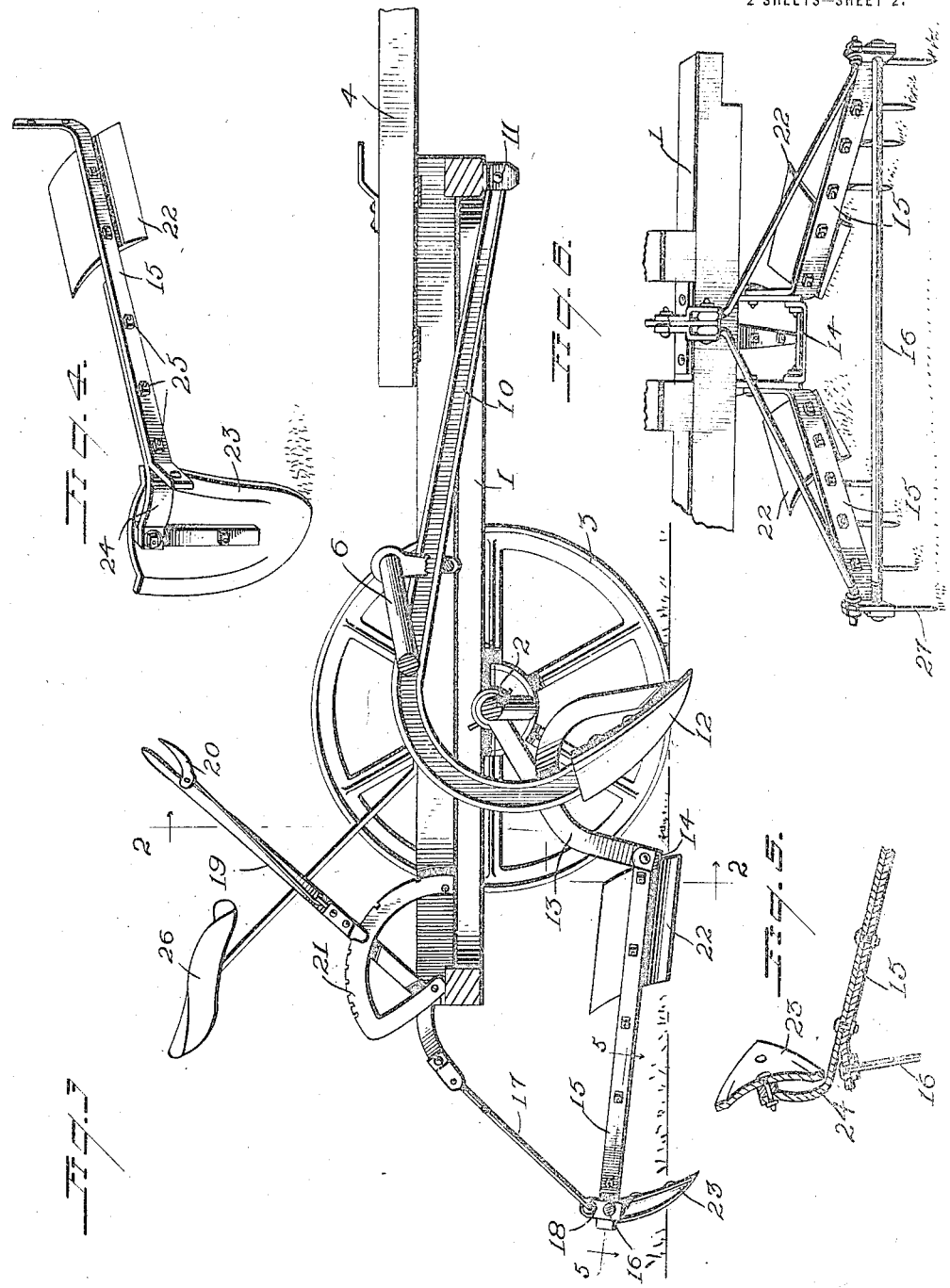
WITNESSES
George C. Myers.
W. E. Beck
INVENTOR
JUDD B. CRANE,
BY
ATTORNEYS

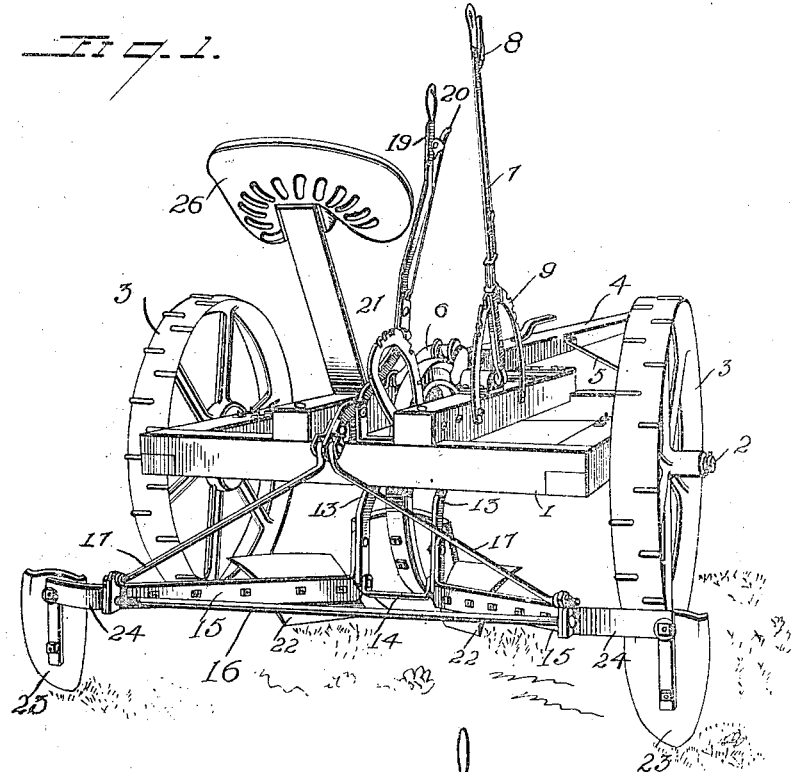
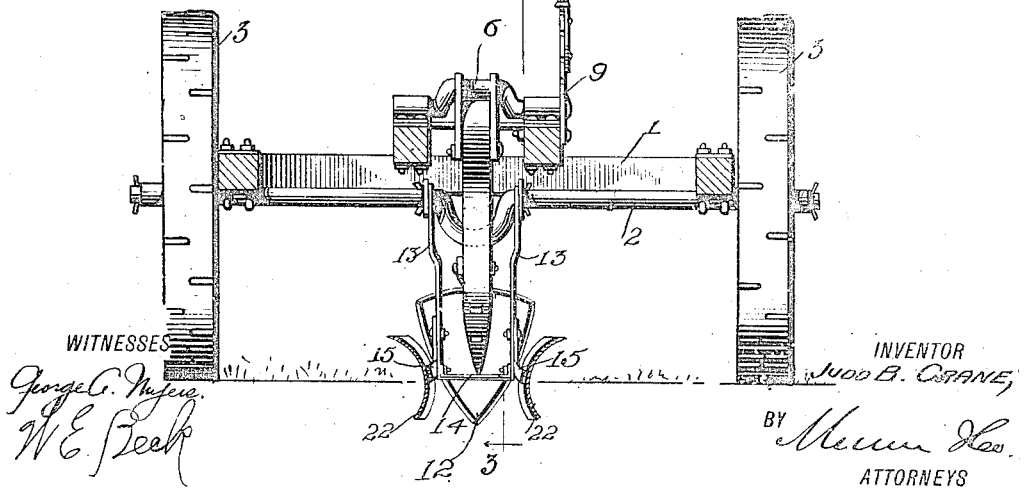

UNITED STATES PATENT OFFICE.

JUDD BECKWITH CRANE, OF ELLENSBURG, WASHINGTON.

IRRIGATION-PLOW.

1,248,271.  Specification of Letters Patent.  Patented Nov. 27, 1917.

Application filed July 6, 1917. Serial No. 178,913.

*To all whom it may concern:*

Be it known that I, JUDD B. CRANE, a citizen of the United States, and a resident of Ellensburg, in the county of Kittitas and State of Washington, have invented new and useful Improvements in Irrigation-Plows, of which the following is a specification.

My invention is an improvement in irrigation plows, and has for its object to provide a plow of the character specified, especially adapted for forming irrigation ditches, wherein the plow is supported for adjustment vertically to provide for different depths of ditches, and wherein mechanism is provided in connection with the plow for smoothing the ground on each side of the ditch and preventing clods and the like from falling into the ditch, and wherein the plow is so arranged that one or three ditches may be simultaneously plowed, as may be desired.

In the drawings:

Figure 1 is a perspective view of the improved plow, looking from the rear;

Figs. 2 and 5 are sections on the lines 2—2 and 5—5, respectively, of Fig. 3, each view looking in the direction of the arrows adjacent the line;

Fig. 3 is a section on the line 3—3 of Fig. 2, looking in the direction of the arrows adjacent the line;

Fig. 4 is a perspective view of one of the auxiliary plows;

Fig. 5 is a section on the line 5—5 of Fig. 3, looking in the direction of the arrows adjacent to the line;

Fig. 6 is a partial perspective view looking from the rear and showing the harrow construction.

In the present embodiment of the invention, a suitable supporting frame 1 is provided, upon which is mounted an axle 2, and wheels 3 are journaled on the ends of the axle. A tongue 4 is connected with the frame, and the tongue is braced against the frame by inclined braces 5.

A shaft 6 is journaled on the frame, and the said shaft has its central portion offset laterally from the ends. A lever 7 is secured to one end of the shaft, the said lever having latch mechanism 8 coöperating with a toothed quadrant 9 on the frame for holding the lever in adjusted position, and the beam 10 of the plow is connected with the shaft intermediate its ends, the front end of the beam being pivoted at 11 to the frame. A plow 12 is secured to the beam, just below the axle, and it will be evident that by moving the lever in the proper direction the plow may be adjusted to vary the depth of the cut.

Bars 13 are journaled on the axle at each side of the plow, and the lower ends of the bars are connected by a substantially U-shaped member 14. Plates 15 are pivoted to the bars 13, and the said plates extend rearwardly in diverging relation, as shown in Figs. 1 and 3. The rear ends of these plates 15 are connected by a rod 16, the said rod holding them in spaced relation and links 17 are connected to the rods by bracket plates 18 at one end of the links, and the other ends of the links are connected to a lever 19 pivoted on the frame and having latch mechanism 20 coöperating with a toothed segment 21 on the frame to hold the lever in adjusted position. By means of the lever the rear ends of the plates 15 may be raised and lowered. Scrapers 22 are secured to the plates 15 near their front ends, and it will be noticed from an inspection of Figs. 1 and 2 that these scrapers are curved transversely, and are arranged with their concaved faces outwardly, in order to scrape and deflect the soil at each side of the ditch formed by the plow 12.

Auxiliary plows 23 may be connected with the rear ends of the plates 15 when it is desired to make three ditches simultaneously. These auxiliary plows are connected to extension plates 24, which are secured to the plates 15 at their rear ends, the arrangement being such that the auxiliary plows 23 are spaced outwardly just outside of the wheels 3 at each side of the frame. These extension plates 24 are secured to the plates 15 by means of bolts and nuts 25, and the depth of the cut of the said auxiliary plows may be adjusted by the lever 19.

A seat 26 is arranged at the rear end of the frame, in convenient position with respect to the levers 8 and 19, and when desired, harrow teeth may be connected with the plates 15, as shown in Fig. 6. The same bolts and nuts 25 that are used to connect the extension plates 24 to the plates 15 are made use of to connect the harrow teeth 27 to the frame consisting of the plate 15 and rod 16.

In operation, the improved plow is drawn along the line of the ditch, with the plow 12 at the proper depth, which may be regulated by means of the lever 8. The plow 12 throws the soil out on each side, and the scrapers or levelers 22 move this soil back from the edge of the ditch, leveling the said edge and preventing the formation of high banks. In some soils the ditches may be nearer together than in others, and when the conditions are suitable, the auxiliary plows 23 may be attached, the said plows being used to form additional ditches at each side of the ditch formed by the plow 12.

When it is not desired to form additional ditches, but to level and rake the soil at each side of the ditch farther out than can be done by the scrapers or levelers 22, the harrow teeth 27 are attached.

I claim:

1. A plow comprising a wheel supported frame, a plow beam pivoted at the front of the frame and carrying the plow at its rear end, means on the frame for raising and lowering the plow, plates supported from the frame and diverging rearwardly, the said plates being upon opposite sides of the plow, and scraper or leveler blades secured to the plates in rear of the plow, said blades being curved and arranged with their concave faces outward, auxiliary plows having means for permitting them to be connected with the rear ends of the plates, and means on the frame for raising and lowering the rear ends of the plates.

2. A plow comprising a wheel supported frame, a plow beam pivoted at the front of the frame and carrying the plow at its rear end, means on the frame for raising and lowering the plow, plates supported from the frame and diverging rearwardly, said plates being upon opposite sides of the plow, scraper and leveler blades secured to the plates in rear of the plow, said blades being curved and arranged with their concave faces outward, and means on the frame for raising and lowering the rear ends of the plates.

3. A plow comprising a wheel supported frame, a plow beam pivoted at the front of the frame and carrying the plow at its rear end, means on the frame for raising and lowering the plow, plates supported from the frame and diverging rearwardly, said plates being upon opposite sides of the plow, and scraper or leveler blades secured to the plates in rear of the plow.

4. A plow comprising a wheel supported frame, a plow beam pivoted at the front of the frame and carrying the plow at its rear end, means on the frame for raising and lowering the plow, plates supported from the frame and diverging rearwardly, said plates being upon opposite sides of the plow, scraper or leveler blades secured to the plates in the rear of the plow, and teeth carried by the frame behind and at the outer sides of the leveler blades.

5. A plow comprising a wheel supported frame, a plow beam pivoted at the front of the frame and carrying the plow at its rear end, means on the frame for raising and lowering the plow, plates supported from the frame and diverging rearwardly, said plates being upon opposite sides of the plow, scraper and leveler blades secured to the plates in the rear of the plow, said blades being curved and arranged with their concave faces outward, means on the frame for raising and lowering the rear ends of the plates, and teeth supported by the diverging plates in rear and at the outer sides of the leveler blades.

JUDD BECKWITH CRANE.

Witnesses:
F. E. CRAIG,
EDNA CRAIG.